United States Patent [19]

Stratienko

[11] 4,185,539
[45] Jan. 29, 1980

[54] LOCKING DEVICE FOR HYDRAULIC ACTUATOR

[76] Inventor: Andrew Stratienko, 8503 Elliston Dr., Philadelphia, Pa. 19118

[21] Appl. No.: 844,359

[22] Filed: Oct. 21, 1977

Related U.S. Application Data

[63] Continuation-in-part of Ser. No. 775,174, Mar. 7, 1977, Pat. No. 4,097,167.

[51] Int. Cl.² ............................................. F15B 15/26
[52] U.S. Cl. ........................................... 91/45; 92/24; 92/27; 91/44; 188/67; 74/531; 403/31
[58] Field of Search ................. 403/15, 31, 32, 104, 403/368, 370, 371, 166; 74/531; 188/67, 170; 92/24, 27, 28; 91/44, 45

[56]  References Cited

U.S. PATENT DOCUMENTS

| | | | |
|---|---|---|---|
| 2,455,439 | 12/1948 | Page | 92/15 X |
| 2,755,093 | 7/1956 | Peter et al. | 403/370 X |
| 3,531,216 | 9/1970 | Callahan | 403/371 X |
| 3,610,285 | 12/1969 | Passaggio | 251/368 X |
| 3,643,765 | 2/1972 | Hanchen | 188/67 X |
| 3,918,346 | 11/1975 | Ziegler | 188/170 X |
| 3,941,141 | 3/1976 | Robert | 188/67 X |

Primary Examiner—Wayne L. Shedd

[57]  ABSTRACT

Disclosed is a mechanical locking device for locking a rod in a conventional hydraulic actuator, such as a hydraulic cylinder or a rotary actuator. The device comprises a radially contractible locking ring having a cylindrical inner surface for gripping the rod when the locking ring is contracted and an outer surface which is axially inclined, means for positively securing the locking ring around the rod in a position axially fixed in at least one direction with respect to the actuator housing, a ring-contracting member around the locking ring and having an inner surface which is axially inclined at the same angle as the outer surface of the locking ring for engaging that surface, and means for applying an axial force to the ring-contracting member in the direction of the inner surface axial inclination to cause the ring-contracting member to slide axially on the locking ring thereby causing the locking ring to contract and grip the rod.

18 Claims, 5 Drawing Figures

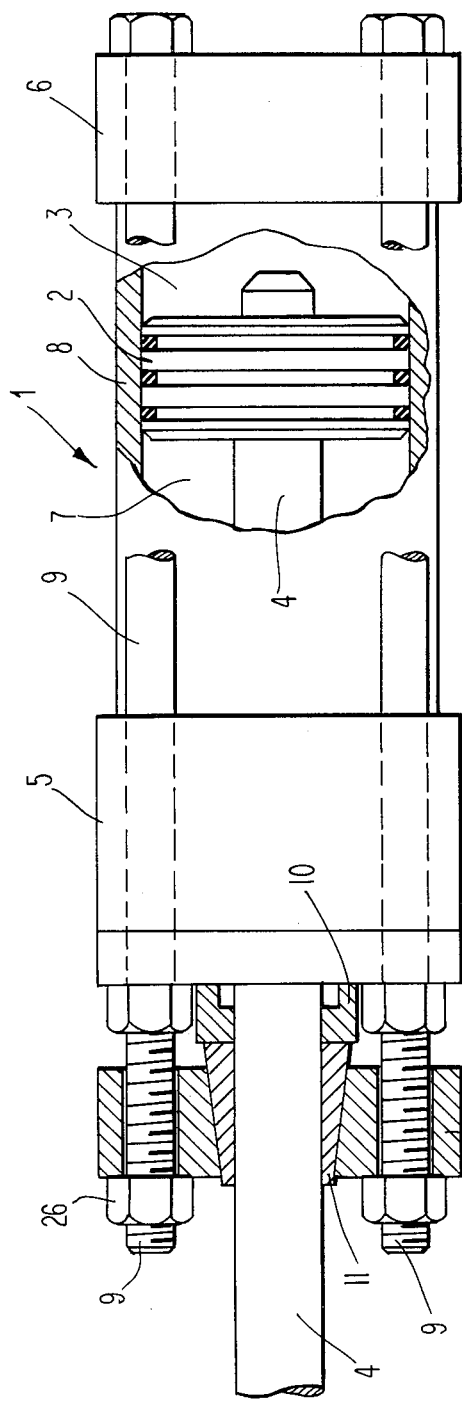
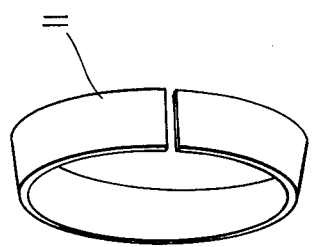
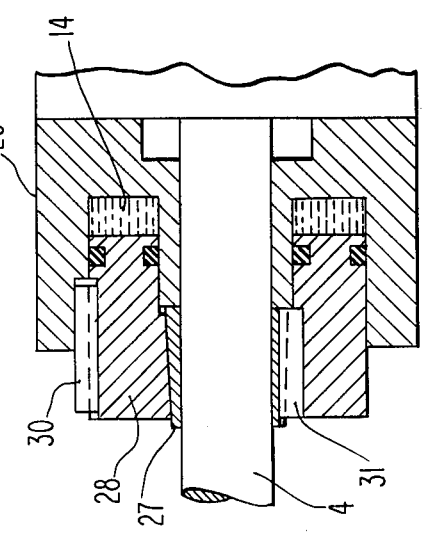

LOCKING DEVICE FOR HYDRAULIC ACTUATOR

RELATED APPLICATIONS

This application is a Continuation-in-part of U.S. application Ser. No. 775,174, entitled THRUST COLLAR, and filed Mar. 7, 1977, in the name of Andrew Stratienko, now U.S. Pat. No. 4,097,167, issued June 27, 1978.

BACKGROUND OF THE INVENTION

1. Field of the Invention

The present invention relates to hydraulic actuators of the type used to exert large forces through a rod when hydraulic pressure is applied to the actuator, which may be a hydraulic cylinder for reciprocatably driving the rod or a rotary actuator for rotatably driving the rod. More specifically, the invention is a rod locking device for locking the rod of a hydraulic actuator in a desired position.

2. Description of the Prior Art

It is highly desirable to be able to lock the driven rod in a hydraulic actuator for safety reasons in case of a sudden loss of pressure as well as to avoid small, but undesirable movements of the rod due to leaking of hydraulic fluid past the seals within the actuator or because of compressibility of the hydraulic fluid. Conventional locking devices are generally either the mechanical type or the hydraulic type. Mechanical types hold the rod in the desired position better, but the hydraulic types are simpler. The hydraulic types work by blocking the column of hydraulic fluid and are the least expensive and usually are smaller than the mechanical types.

In some applications, mechanical locking is the only acceptible solution. For example, locking must be done mechanically in a machine station on a production line where the hydraulic actuator muct maintain a very precise position for a reasonable length of time to produce an acceptible product. In contrast, a hydraulic column blocking type locking device is all that is required in the actuating cylinders on the scoop or blade of a bulldozer, where a high degree of blade position is not required and the duration in the locked position is usually very short.

Mechanical locking devices can be subdivided into three groups, particularly for hydraulic cylinders. The first is end position locking, which locks at stroke extremes only and is best illustrated by those using a toggle or ball mechanism which is spring-loaded-to-engage and pressure-to-release device providing a mechanical connection between the piston and cylinder barrel or end cap.

The second type of mechanical lock device is the incremental locking type, which locks in specific stroke positions (for example, every 1/16 of an inch of stroke). An example is a unit using a helical groove on the piston rod which engages a gear that is locked by a panel-type mechanism. Locking can only be incremental because the panel must engage discrete tooth positions on the gear.

The third type of mechanical locking device is the infinite position type which locks at any point of stroke. This type has the broadest application possibilities. One form is a hydraulic cylinder with an integral Acme screw. External power is needed to move the screw with the piston. Another form is a central ball screw which follows the hydraulic piston through its stroke. The locking function is provided externally by applying a brake to the screw.

These types of mechanical locking devices for hydraulic cylinders are used in many industrial applications where they provide the precision and durability advantage of the mechanical lock. However, they do involve rather complex and expensive mechanisms to attain a locking action, particularly the infinite position type. The first two mentioned mechanical locking types are generally less complex, but they do not provide the ability to lock the piston rod in any position.

One device which combines the positive holding advantage of a mechanical lock with infinite position lock capability of a blocked fluid column is the Bear-Loc device, which consists of a rod, a barrel and a locking sleeve. The sleeve is an extension of the cylinder rod end cap, which forms an interference fit with the outside diameter of the rod. When hydraulic fluid under pressure is introduced between the sleeve and rod, the sleeve expands radially, providing enough clearance to allow the rod to rotate or stroke. The lock re-engages automatically when fluid pressure is removed. However, in spite of its advantages the Bear-Loc device is complex, difficult to install and remove, and not readily adaptable to different size rods.

SUMMARY OF THE INVENTION

It is an object of the present invention to provide a mechanical rod locking device for hydraulic actuators, and particularly an infinite position locking device which is simpler, smaller and less expensive.

These and other objects are accomplished by the rod locking device of the present invention, which is used in conventional hydraulic actuators, such as hydraulic cylinders having a reciprocatably driven rod extending from the hydraulic cylinder housing or a hydraulic rotary actuator having a rotatably driven rod extending from the actuator housing. The rod locking device of the present invention comprises a radially contractible locking ring having a cylindrical inner surface for gripping the rod when the locking ring is contracted and an outer surface which is axially inclined, means for positively securing the locking ring around the rod in a position axially fixed in at least one direction with respect to the actuator housing, a ring-contracting member around the locking ring and having an inner surface which is axially inclined at the same angle as the outer surface of the locking ring for engaging that surface, and means for applying an axial force to the ring-contracting member in the direction of the inner surface axial inclination to cause the ring-contracting member to slide axially on the locking ring thereby causing the locking ring to contract and grip the rod.

In a preferred embodiment of the invention, the rod locking device is capable of automatic operation and further includes spring biasing means for applying an axial biasing force to the ring-contracting member in the direction of axial inclination, hydraulic pressure means for applying an axial force to the ring-contracting member in the direction opposite the biasing force from the spring means, and means for reducing the pressure in the hydraulic pressure means so that the biasing force from the spring means automatically causes the ring-contracting member to slide axially on the locking ring and thereby cause it to contract and grip the rod.

The locking device of the invention provides the advantage of infinite position locking, yet is compact, simple, and inexpensive. It also has the advantage of being able to lock the rod as secure as mechanical locks without any backlash. Furthermore, it is universally adaptable to standard hydraulic actuators and can be easily adapted to fit different size rods for a particular hydraulic actuator. The device can be easily dismounted in case actuator repairs are needed and it does not affect the alignment of the rod or actuator when installed.

BRIEF DESCRIPTION OF THE DRAWINGS

FIG. 1 is a sectional view of a hydraulic cylinder employing one embodiment of the rod locking device of the present invention.

FIG. 2 is a perspective view of the locking ring which is part of the present invention.

FIG. 5 is a sectional view of the end of a rotary actuator employing another automatic embodiment of the rod locking device of the present invention.

DETAILED DESCRIPTION OF THE PREFERRED EMBODIMENTS

Figure 3:
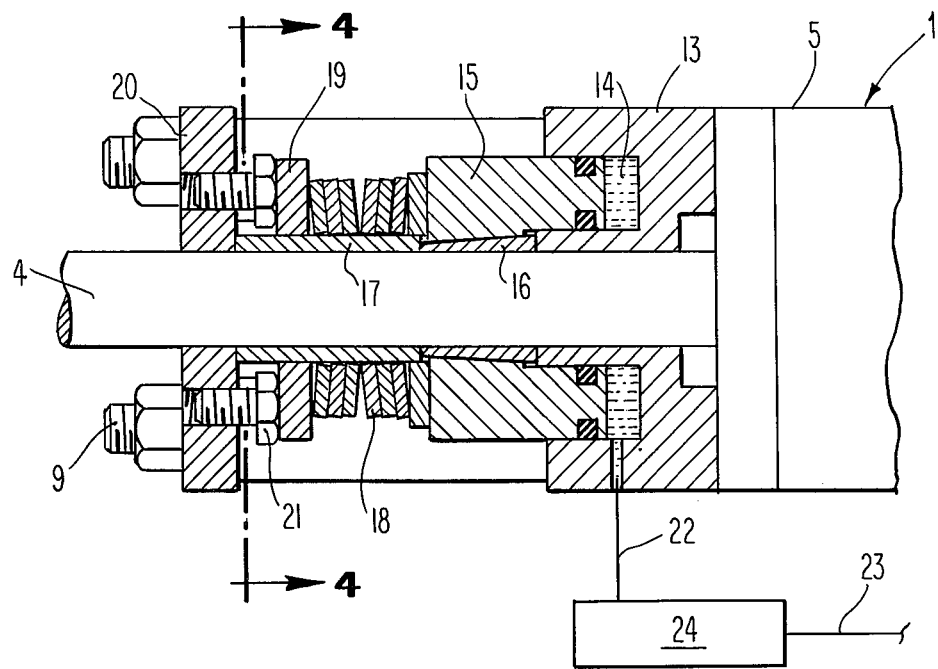
FIG. 3 is a sectional view of the end of a hydraulic cylinder employing an automatic embodiment of the rod locking device of the present invention.

FIG. 1 illustrates a conventional hydraulic cylinder, which consists of piston 2 within a cylinder with one pressure chamber 3 on one side of piston 2 and a rod 4 connected to the piston 2 on the other side. Rod 4 passes through cylinder head 5 for transmitting the desired work force from the hydraulic cylinder. On the opposite end of the hydraulic cylinder is a cylinder cap 6 which forms one end of pressure chamber 3. Cylindrical wall 8 provides the remaining enclosure for pressure chamber 3, as well as for another pressure chamber 7 on the opposite side of piston 2. The entire housing assembly of head 5, cap 6 and cylindrical wall 8 is held together by a plurality of bolts 9.

In operation, hydraulic fluid is applied under pressure to either pressure chamber 3 or pressure chamber 7 to move the piston 2 and rod 4 forward or rearward, depending upon which chamber is pressurized. The amount of force which can be exerted through rod 4 is dependent upon the size of piston 3 and the hydraulic pressure within the pressure chamber. Some hydraulic cylinders are capable of exerting very large forces, hundreds of thousands of pounds, for example.

The rod locking device of the present invention is provided by locking ring 11 and ring-contracting member 12, along with sleeve 10 which secures the locking ring 11 against axial movement towards the cylinder housing 1 and means for applying an axial force to the ring-contracting member 12. The axial force applying means is provided by tightening nuts 26 on bolts 9, which are extended beyond the cylinder head 5 so that nuts 26 can be tightened against ring-contracting member 12. Sleeve 10 provides a flat surface for locking ring 11 to fit firmly against, but it should be noted here that sleeve 10 may not always be necessary since in some cases the locking ring 11 might be placed directly against cylinder head 5, in which case it provides the means for securing locking ring 11 against axial movement in that direction.

Locking ring 11 is radially contractible, preferably due to slot illustrated in FIG. 2 and is resilient enough to return to expanded size upon release of the contracting force. It has a cylindrical inner surface slightly larger than the diameter of rod 4 for gripping the rod 4 when the locking ring 11 is contracted. The outer surface of locking ring 11 is axially inclined (tapered in a conical shape). The ring-contracting member 12 has an opening which is axially inclined at the same angle as the outer surface of the locking ring 11 for engaging that surface. The overall shape of the ring-contracting member 12 is preferably circular or square, but could be almost any shape since the outer surface does not need to cooperate with any other element.

Holes appropriately spaced in the ring-contracting member 12 permit passage of bolts 9. Nuts on bolts 9 are tightened to push ring-contracting member 12 towards cylinder head 5, which causes locking ring 11 (being prevented from moving towards cylinder head 5 by sleeve 10) to contract and grip rod 4 and lock it against movement in both directions until nuts 26 are backed off to relieve the axial force exerted on ring-contracting member 12.

The locking ring 11 is designed to be self-releasing so that it automatically pushes ring-contracting member 12 back away from cylinder head 5 when the axial force is released, and thereby loosens its grip on rod 4. To be self-releasing, the radial force exerted by the contracted locking ring 11 on the ring-contracting member 12 has an axial component of force which tends to disengage and move the ring-contracting member 12 away from the cylinder head 5. By providing a large enough angle of axial inclination to produce a self-releasing component larger than the frictional resistance on the inclined surfaces, the ring-contracting member 12 will disengage from the locking ring 11 upon manual release of the nuts 26 on bolts 9. This normally means that the angle of axial inclination of locking ring 11 and ring-contracting member 12 will be over 15°.

Locking ring 11 and ring-contracting member 12 can be made from any strong material, steel being preferred for its low cost and machinability. Locking ring 11 can be conveniently produced on a lathe and the inner tapered surface of ring-contracting member 12 can be produced by boring. Both tapered surfaces of locking ring 11 and ring-contracting member 12 should be finished to have a very smooth surface to reduce friction therebetween. Preferably, a lubricant is used to further decrease friction. The lubricant can be of a conventional type or it can be a stable dry anti-friction material preventing metal to metal contact thereon, such as those disclosed in U.S. Pat. No. 3,501,183 issued to Andrew Stratienko, which disclosure is herein incorporated by reference. On the other hand, the inner surface of the locking ring 11 is preferably rougher than the outer surface, so that it provides the desired friction factor to lock the rod 4 in position against very large forces.

The diameter of the inside surface of the locking ring 11 is slightly larger than the diameter of rod 4, so that rod 4 is free to slide in locking ring 11, but will be gripped tightly upon a small amount of contraction of locking ring 11. A locking device of the present invention which is particularly chosen for a rod of one diameter can be conveniently adapted to another rod 4 of a different diameter (within limits) by merely changing the locking ring 11 to one of another inside diameter but the same outside size, which results from having a different wall thickness.

The inside surface of the ring-contracting member 12 matches in size the outside surface of locking ring 11.

That is, the angle of inclination is the same for both, and the diameters of the two are such as to permit firm engagement of the ring-contracting member 12 over the locking ring 11 in a nesting arrangement. Once firm engagement is accomplished, any further movement of the ring-contracting member 12 in the direction of axial inclination of the cooperating tapered surfaces causes the locking ring to contract.

The means for moving the ring-contracting member 12 can be provided by a variety of axial force applying means, the screw means illustrated in FIG. 1 being one type. The plurality of screws shown in FIG. 1 could be replaced by other force applying means, such as that illustrated in FIG. 3.

Figure 4:
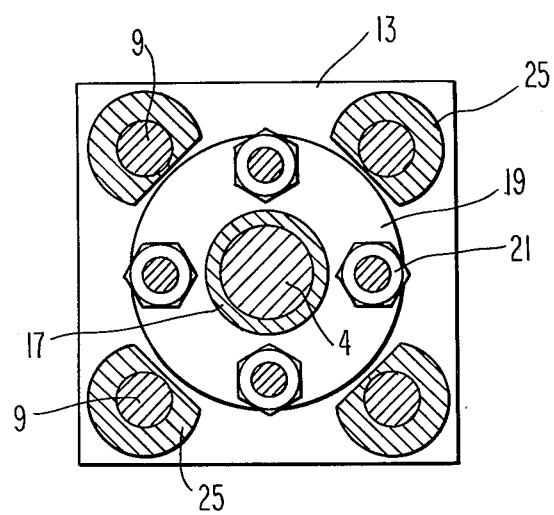
FIG. 4 is an elevation view taken along lines 4—4 of FIG. 3.

FIGS. 3 and 4 illustrate a preferred embodiment of the present invention which is an automatic rod locking device which is engaged and disengaged through hydraulic pressure means. In this embodiment a head extension 13 is placed against cylinder head 5 of a hydraulic cylinder housing 1 like that of FIG. 1 and includes a hydraulic chamber 14 having a ring-like shape. Ring-contracting member 15 has a circular extension which fits and reciprocably slides in hydraulic chamber 14. Seals are provided so that hydraulic pressure applied to hydraulic chamber 14 will push ring-contracting member 15 away from cylinder head 5 without leakage of the hydraulic fluid.

Locking ring 16 is firmly positioned against head extension 13 on one side and against circular spacer 17 on the other side. Springs 18 are positioned around spacer 17 and against ring-contracting member 15. A cylindrical plate 19 is positioned against the other end of spring 18 and has its axial position along spacer 17 adjusted by adjusting screws 21 threaded into plate 20. The axial force applied to ring-contracting member 15 by springs 18 is thereby adjusted through adjusting screws 21. Plate 20 is held in a fixed position with respect to the cylinder housing 1 by bolts 9 and tubular spacers 25.

Hydraulic fluid is supplied to hydraulic chamber 14 by conventional supply piping 22. The actual pressure within hydraulic chamber 14 is controlled by control means 24 (schematically illustrated), which may be a conventional manually or automatically controlled valve. If an automatically controlled valve is used, it may be actuated by a conventional pressure switch. For example, the pressure switch could sense the pressure in control line 23 which is connected either directly or indirectly to the hydraulic fluid in one of the pressure chambers inside the hydraulic cylinder housing 1. The pressure switch will sense any reduction in the pressure in the hydraulic cylinder, such as a sudden loss of pressure, and can reduce the pressure in the hydraulic chamber 14. By proper preadjustment of the axial biasing force from spring 18, the release of pressure in hydraulic chamber 14 results in automatic axial movement of ring-contracting member 15 towards the cylinder housing 1 (direction of axial inclination of the outer surface of locking ring 16) and contraction of locking ring 16. Thus, the rod 4 is instantly and automatically locked in position if pressure is inadvertently lost in the hydraulic cylinder, providing an obvious safety advantage.

When it is desired to release the lock on rod 4, pressure is again applied to hydraulic chamber 14 to offset the force of spring 18 and push the ring-contracting member 15 back away from cylinder head 5. The device can also be used in a manual mode by merely applying or releasing hydraulic pressure within hydraulic chamber 14 when desired. It should be noted here that this embodiment of the invention may be operatable without the use of self-releasing feature described above, since a positive axial force for disengaging the ring-contracting member 15 from the locking ring 16 is provided by the hydraulic pressure in hydraulic chamber 14.

Locking ring 16 is similar in design to locking ring 11 of FIG. 1, but preferably has a shallower angle of axial inclination, less than 15°, to provide a relatively large gripping force by the locking ring on the rod with only a relatively small axial force being applied to the ring-contracting member. The advantages of employing smaller axial force applying means are obvious in that it will be more compact and less expensive. Use of a stable dry anti-friction material is also highly preferred to further reduce the size of the axial forces needed. The advantages of a shallow angle of inclination and the stable dry anti-friction material will generally result in choosing a locking ring 16 which happens to be self-tightening, as described in the previously mentioned U.S. Pat. No. 3,501,183 and the parent application, U.S. Ser. No. 775,174. Self-tightening can be briefly described here as occurring when the frictional force between the relaxed locking ring and the rod is larger than the axial component of force exerted on the locking ring from the axially fixed ring-contracting member so that the locking ring slides within the ring contracting member and contracts when the rod moves in a direction opposite the axial inclination of the locking ring.

The ability to self-tighten is a disadvantage when used in the manual embodiment of FIG. 1, because the locking device will be activated by rod movement in the direction opposite locking ring 11 inner surface inclination. However, it is not a disadvantage in the embodiment of FIG. 3 where the locking ring is secured axially in both directions by the end surfaces of circular spacer 17 and head extension 13 against both ends of locking ring 16 to prevent the locking ring 16 from moving in both axial directions, thus preventing self-tightening from occurring. Thus, the locking device in the embodiment of FIG. 3 can be self-tightening, but the locking device of the embodiment of FIG. 1 should have an angle of inclination too high to result in self-tightening.

A further advantage is provided by securing the locking ring by butting its ends against surfaces to prevent it from moving axially with respect to the actuator housing. The angle of inclination of the locking ring is small enough to provide a larger locking force preventing movement of the rod than the force applied to the ring-contracting member. By securing the locking ring at the ends of the locking ring the force exerted by the rod is resisted entirely by the locking ring and the ring-contracting member does not have to be designed to withstand this large force. The manual embodiment illustrated in FIG. 1 secures the locking ring 11 at one end (the thicker end) with sleeve 10, and provides the advantage in one direction only; however, the ring-contracting member is preferably designed to withstand the rod force so that it can lock the rod against movement in either direction.

The rod locking device of the present invention can also be used in hydraulic actuators which are rotary actuators by including means to secure the locking ring against rotational movement with respect to the actuator housing. FIG. 5 illustrates an automatic rod locking device of the present invention adapted for use in a rotary actuator. The device is similar to that illustrated in FIG. 3 except that rod 4 is a rotatably driven rod extending from the conventional actuator housing (not shown) and slots are provided in locking ring 27 and ring-contracting member 28 for placement of key 31. Key 31 prevents locking ring 27 from rotating in ring-contracting member 28, and another pair of slots are provided in the outer surface of ring-contracting member 28 and in head extension 29 for key 30 to prevent rotation of ring-contracting member 28 with respect to the actuator housing.

In operation, the rod locking device of FIG. 5 works like that of FIG. 3. Springs (not shown) exert an axial biasing force on ring-contracting member 28, which is normally offset by the axial force provided by hydraulic pressure in pressure chamber 14. A circular spacer like 17 shown in FIG. 3 would normally be included also. It should be pointed out that the manual embodiment illustrated in FIG. 1 could also be adapted for use in a rotary actuator by installing a key in slots in locking ring 11 and ring-contracting member 12.

Having described the preferred embodiments of the invention, other variations within the scope of the invention will be obvious to one skilled in the art. For example, the locking ring has been described as a single circular member. However, it can perform its function without completely encircling the rod, although it preferably does. Also, it could be provided by two or more segments of a ring. Thus, it can be seen that the term "ring" is used herein in a broad sense.

What is claimed is:

1. In a hydraulic actuator which includes a movable rod extending from the actuator housing, an infinite-position rod locking device comprising:
   a radially contractible locking ring of strong material having a cylindrical inner surface for gripping the rod when the locking ring is contracted and having an axially inclined outer surface; means for securing the locking ring around the rod in a position axially fixed in only one direction with respect to the actuator housing;
   a ring-contracting member around the locking ring and having an inner surface which is axially inclined at the same angle as the outer surface of the locking ring for cooperating with and engaging that surface;
   screw means for applying an axial force to the ring-contracting member in the direction of inner surface inclination, which is the one direction in which the locking ring is axially fixed with respect to the actuator housing, to cause the ring-contracting member to slide axially on the locking ring thereby causing the locking ring to contract and grip the rod, and
   the angle of inclination of the cooperating tapered surfaces of the locking ring and the ring-contracting member is too high to result in self-tightening and produces a larger axial disengaging component force than the frictional resistance force on the inclined surfaces, whereby the locking device is not actuated by rod movement in the direction opposite the direction of axial force provided by the screw means and the locking device is self-releasing upon release of the axial force provided by the screw means.

2. The rod locking device of claim 1, wherein the hydraulic actuator is a hydraulic cylinder having a reciprocatably driven rod extending from the hydraulic cylinder housing, and the locking device locks the rod against axial movement.

3. The rod locking device of claim 1, wherein the hydraulic actuator is a rotary actuator having a rotatably driven rod extending from the actuator housing, and the means for securing the locking ring also secures the locking ring against rotational movement with respect to the actuator housing to enable the locking device to lock the rod against rotational movement and comprising slots in the locking ring and in the ring-contracting member and a key within the slots for preventing rotation of the locking ring within the ring-contracting member.

4. In a hydraulic actuator which includes a moveable rod extending from the actuator housing, an automatic infinite-position rod locking device comprising:
   a radially contractible locking ring of strong material having a cylindrical inner surface for gripping the rod when the locking ring is contracted and having an axially inclined outer surface;
   means for securing the locking ring around the rod in a position fixed axially in at least one direction with respect to the actuator housing;
   a ring-contracting member around the locking ring and having an inner surface which is axially inclined at the same angle as the outer surface of the locking ring for cooperating with and engaging that surface;
   spring means for applying an axial biasing force to the ring-contracting member in the direction of axial inclination, the angle of axial inclination of the cooperating tapered surfaces of the locking ring and the ring-contracting member being less than 15° to permit a relatively small axial biasing force from the spring means to exert a relatively large gripping force by the locking ring on the rod, and at least one of the cooperating tapered surfaces of the locking ring and the ring-contracting member has a stable dry anti-friction material preventing metal to metal contact thereon;
   hydraulic pressure means for applying an axial force to the ring-contracting member in the direction opposite the biasing force from the spring means; and
   means for reducing the pressure in the hydraulic pressure means so that the biasing force from the spring means automatically causes the ring-contracting member to slide axially on the locking ring and thereby cause the locking ring to contract and grip the rod.

5. The rod locking device of claim 4, wherein the means for securing the locking ring comprises a surface butting against the thicker end of the locking ring to prevent the locking ring from moving in the direction of the surface.

6. The rod locking device of claim 4, including a hydraulic pressure source for the hydraulic actuator and wherein the means for reducing the hydraulic pressure is interconnected to the hydraulic pressure source of the hydraulic actuator to automatically reduce the hydraulic pressure in the locking device when the pressure in the actuator is reduced, whereby the rod is automatically locked in position if pressure is lost in the actuator.

7. The rod locking device of claim 4, wherein the hydraulic actuator is a hydraulic cylinder having a reciprocatably driven rod extending from the hydraulic cylinder housing, and the locking device locks the rod against axial movement.

8. The rod locking device of claim 4, wherein the hydraulic actuator is a rotary actuator having a rotatably driven rod extending from the actuator housing, and the means for securing the locking ring also secures the locking ring against rotational movement with respect to the actuator housing to enable the locking device to lock the rod against rotational movement and comprises rotational locking means between the locking ring and the ring-contracting member and rotational locking means between the ring-contracting member and the actuator housing.

9. The rod locking device of claim 7, wherein the means for securing the locking ring comprises surfaces butting against both ends of the locking ring to prevent the locking ring from moving in both axial directions.

10. The rod locking device of claim 4, wherein the locking ring is made of metal.

11. The rod locking device of claim 1, wherein the outer surface of the locking ring consists essentially of an axially inclined surface and the inner surface of the locking ring grips the rod over the full axial dimension of the locking ring when contracted.

12. The rod locking device of claim 4, wherein the outer surface of the locking ring consists essentially of an axially inclined surface and the inner surface of the locking ring grips the rod over the full axial dimension of the locking ring when contracted.

13. The rod locking device of claim 11, wherein the locking ring has a slot extending the full axial dimension of the locking ring.

14. The rod locking device of claim 4, wherein the hydraulic pressure means includes a hydraulic chamber formed by a ring-like shaped cavity in a head extension placed against the hydraulic actuator and a circular extension of the ring-contracting member which reciprocably slides in the cavity, and seals for preventing the leakage of hydraulic fluid from the cavity, which seals are not in contact with the rod, and the locking ring inner surface is in direct contact with the rod without provisions for lubricants therebetween when the locking ring grips the rod.

15. The rod locking device of claim 4, wherein the relationship between the inner surface of the locking ring and the rod and between the outer surface of the locking ring and the inner surface of the ring-contracting member causes the locking ring to be self-tightening and self-releasing.

16. In a hydraulic actuator which includes a moveable rod extending from the actuator housing and the hydraulic actuator includes a head, cap and cylindrical wall, all held together by a plurality of bolts which extend beyond the head, an automatic infinite-position rod locking device comprising:

a radially contractible locking ring of strong material having a cylindrical inner surface for gripping the rod when the locking ring is contracted and having an axially inclined outer surface;

means for securing the locking ring around the rod comprising surfaces butting against both ends of the locking ring to prevent the locking ring from moving in both axial directions with respect to the actuator housing;

a ring-contracting member around the locking ring and having an inner surface which is axially inclined at the same angle as the outer surface of the locking ring for engaging that surface;

spring means for applying an axial biasing force to the ring-contracting member in the direction of axial inclination, the spring means comprising:

a first plate secured to the bolts in a fixed position and through which the rod extends;

a cylindrical spacer through which the rod extends and having one end against the first plate and the other end providing one of the surfaces against which one end of the locking ring butts;

a second plate through which the cylindrical spacer extends;

a spring positioned around the cylindrical spacer with one end against the second plate and the other end against one end of the ring-contracting member; and adjusting screws threaded into the first plate and engaging the second plate for adjusting the axial position of the second plate along the cylindrical spacer and thereby adjust the axial force applied to the ring-contracting member by the spring;

hydraulic pressure means for applying an axial force to the ring-contracting member in the direction opposite the biasing force from the spring means; and means for reducing the pressure in the hydraulic pressure means so that the biasing force from the spring means automatically causes the ring-contracting member to slide axially on the rocking ring and thereby cause the locking ring to contract and grip the rod.

17. The rod locking device of claim 15, further including a cylindrical sleeve around each bolt for positioning the first plate, the cylindrical sleeves each being flattened on the outer surface facing the rod, whereby a larger spring can be positioned around the cylindrical spacer and between the bolts.

18. The rod locking device of claim 1, wherein the hydraulic actuator includes a head, cap, and cylindrical wall, and held together by a plurality of bolts which extend beyond the head, and the ring-contracting member includes a plurality of openings through which each extends one of the plurality of bolts, and the screw means comprises a plurality of nuts, each of which is threaded on one of the plurality of bolts and engages one end of the ring-contracting member to apply axial force to the ring-contracting member when the nuts are tightened.

* * * * *